UNITED STATES PATENT OFFICE.

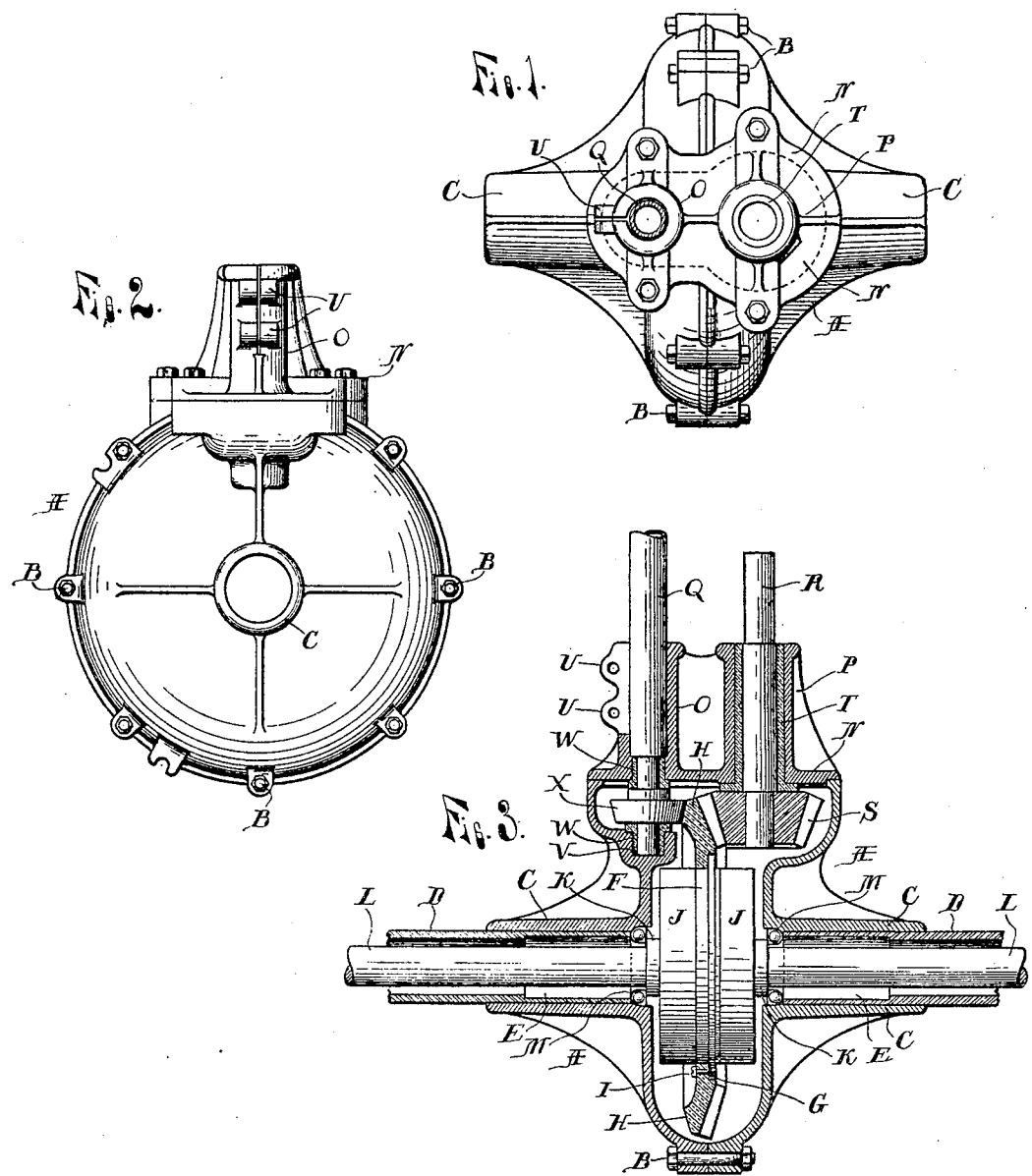

JONATHAN D. MAXWELL, OF DETROIT, MICHIGAN.

DRIVE MECHANISM.

No. 795,296.  Specification of Letters Patent.  Patented July 25, 1905.

Application filed August 1, 1904. Serial No. 219,011.

*To all whom it may concern:*

Be it known that I, JONATHAN D. MAXWELL, a citizen of the United States of America, residing at Detroit, in the county of Wayne and State of Michigan, have invented certain new and useful Improvements in Drive Mechanism, of which the following is a specification, reference being had therein to the accompanying drawings.

This invention relates to certain new and useful improvements in automobiles, referring more particularly to the drive mechanism therefor, and has for its object to provide means for maintaining the drive-gear and pinion in perfect alinement, thereby relieving all undue pressure on the thrust-bearings, and at the same time provide means for inclosing all the working parts in a rigid and dust-proof casing, so that they may be constantly run in oil and form a convenient means for securing the sole strut or distance bar thereto.

To this end the invention consists in the peculiar construction, arrangement, and combination of parts, all as more fully hereinafter described and claimed, reference being had to the accompanying drawings, in which—

Figure 1 is a front view of the gear-case; Fig. 2, an end elevation thereof, and Fig. 3 a horizontal section through the drive-gear and casing.

A is the drive-gear casing, preferably made in two parts secured together by the bolts B and provided with laterally-extending tubular bearings C, in which the two-part axle-sleeve D is secured by brazing or otherwise, the adjacent ends of the sleeve D being smoothed up or bored out at E for the reception of suitable roller-bearings. (Not shown.)

The compensating or equalizing gear, of any well-known make, comprises the central member F, provided with an annular flange G, to which the ring-gear H is secured by bolts I, and J represents the members on either side provided with the bosses for the reception of the adjacent ends of the two-part axle L.

M represents ball-bearing thrust-collars interposed between the adjacent ends of the sleeves D and bosses K.

N is a removable cap closing the front end of the gear-case integrally formed with the sleeves O P for the radius or distance bar Q and drive-shaft R, respectively connected to the frame and motor-shaft by universal joints. (Not shown.)

S is a pinion carried by the shaft R, meshing with the gear H, and T is a bearing sleeved on said shaft.

The sleeve O is split for a distance in from its outer end and provided with clamping-lugs U, so that the tube or bar Q may be securely clamped therein by means of suitable bolts, (not shown,) the inner end of the sleeve along with a recess V in the casing forming convenient seats for the bearings W, in which the antifriction-roll X is journaled, bearing with its face against the back of the gear H near its outer edge, so that any undue pressure tending to throw the gears out of alinement, due to the transmission of power, will be taken up by the roll, the thrust-bearings and bearing-faces of the compensating gear being thereby relieved from undue friction, as it has been found at times where the gear H is unsupported that the strain is so great as to strip the bolts I, besides throwing all of the parts out of alinement and causing them to bind.

What I claim as my invention, and desire to secure by Letters Patent, is—

1. In a drive mechanism, the combination with the drive-shaft axle, drive-gear and pinion, of a casing inclosing said gears provided with laterally-extending sleeves for the axle and a forwardly-extending bearing-sleeve for the drive-shaft, a split clamping-sleeve adjacent to said last-mentioned sleeve, and an antifriction-roller journaled in the casing in rear of the drive-gear.

2. In a drive mechanism, the combination with the axle, drive-gear and pinion, of a casing inclosing said gears, a cover for said casing having a bearing and a clamping-sleeve for the power-transmitting shaft and distance-rod respectively, an antifriction-roller having trunnions journaled in bearings in the casing and cover in rear of the drive-gear and in alinement with the distance-rod.

3. In a drive mechanism, the combination with the distance-bar, drive-shaft, drive-gear and pinion, of a casing inclosing said gears having laterally-extending sleeves, a cap for said casing integrally formed with a bearing and a clamping-sleeve for the drive-shaft and distance-bar respectively, and an antifriction-roller journaled in the casing and engaging said gear at a point opposite said pinion.

4. In a drive mechanism, the combination with the axle, drive-gear and pinion, of a two-part casing inclosing said gears provided with laterally-extending sleeves and with a socket, a cap for said casing provided with a forwardly-extending bearing and a clamping-sleeve for the power-transmitting shaft and distance-rod respectively, bearings in said sleeve and socket, and an antifriction-roll having trunnions journaled in said bearings and engaging the rear face of the drive-gear.

5. In a drive mechanism, the combination with the gear-case, axle and drive-shaft, of the drive-gear and pinion meshing therewith, an antifriction-roller engaging said gear at a point opposite said pinion, and a power-transmitting shaft carrying said pinion journaled in the casing at one side of the gear and a distance-bar secured in the casing on the opposite side of said gear in alinement with the antifriction-roll.

In testimony whereof I affix my signature in presence of two witnesses.

JONATHAN D. MAXWELL.

Witnesses:
OTTO F. BARTHEL,
LEWIS E. FLANDERS.